(12) United States Patent
Maisuria et al.

(10) Patent No.: US 10,725,529 B2
(45) Date of Patent: Jul. 28, 2020

(54) TARGET BASED POWER MANAGEMENT

(71) Applicant: Microsoft Technology Licensing, LLC, Redmond, WA (US)

(72) Inventors: Paresh Maisuria, Issaquah, WA (US); M. Nashaat Soliman, Redmond, WA (US); Julian Doroftei Calinov, Sammamish, WA (US); Sandeep Prabhakar, Bellevue, WA (US); Jihad Tafas, Redmond, WA (US); Eric R. Kratzer, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/633,514

(22) Filed: Jun. 26, 2017

(65) Prior Publication Data
US 2018/0373316 A1    Dec. 27, 2018

(51) Int. Cl.
*G06F 1/3287*    (2019.01)
*G06F 1/26*    (2006.01)
*G06F 1/3234*    (2019.01)
*G06F 9/50*    (2006.01)
(Continued)

(52) U.S. Cl.
CPC ............ *G06F 1/3287* (2013.01); *G06F 1/266* (2013.01); *G06F 1/329* (2013.01); *G06F 1/3212* (2013.01);
(Continued)

(58) Field of Classification Search
CPC ...... G06F 1/3287; G06F 1/266; G06F 1/3212; G06F 9/5094; G06F 1/3265; G06F 1/3275; H04W 52/0251
See application file for complete search history.

(56) References Cited

U.S. PATENT DOCUMENTS 4,743,831 A    5/1988    Young
5,270,946 A    12/1993    Shibasaki et al.
(Continued)

FOREIGN PATENT DOCUMENTS

CN    102185164 A    9/2011
CN    10379304       5/2014
(Continued)

OTHER PUBLICATIONS

"Non Final Office Action Issued in U.S. Appl. No. 15/353,581", dated Sep. 14, 2018, 21 Pages.
(Continued)

*Primary Examiner* — Jaweed A Abbaszadeh
*Assistant Examiner* — Gayathri Sampath
(74) *Attorney, Agent, or Firm* — Liang IP, PLLC

(57) ABSTRACT

A computing device has an energy storage device system with one or more energy storage devices. A target run-time is obtained, which refers to how long the computing device is to run given the current amount of energy in the energy storage device(s). A predicted power usage over the target run-time is determined, and what, if any, power management actions to take in order to achieve the target run-time are determined. The power management actions are then taken. A target charge-time is also obtained, which refers to how long the computing device is to take to charge the energy storage device(s) to a threshold level (e.g., 100% or fully charged). A predicted power gain over the target charge-time is determined, and what, if any, power management actions to take in order to achieve the target charge-time are determined. The power management actions are then taken.

20 Claims, 5 Drawing Sheets

(51) Int. Cl.
    *G06F 1/329*     (2019.01)
    *G06F 1/3212*     (2019.01)
    *H04W 52/02*     (2009.01)

(52) U.S. Cl.
    CPC .......... *G06F 1/3243* (2013.01); *G06F 1/3265* (2013.01); *G06F 1/3275* (2013.01); *G06F 9/5094* (2013.01); *H04W 52/0251* (2013.01); *H04W 52/0267* (2013.01); *H04W 52/0274* (2013.01)

(56) References Cited

U.S. PATENT DOCUMENTS

| | | |
|---|---|---|
| 5,371,682 A | 12/1994 | Levine et al. |
| 5,565,759 A | 10/1996 | Dunstan |
| 5,656,920 A | 8/1997 | Cherng et al. |
| 5,757,163 A | 5/1998 | Brotto et al. |
| 6,225,780 B1 | 5/2001 | Koch |
| 6,288,521 B1 | 9/2001 | Meador |
| 6,289,399 B1 | 9/2001 | Furuichi et al. |
| 6,870,349 B2 | 3/2005 | Cook |
| 7,505,795 B1 | 3/2009 | Lim et al. |
| 7,576,517 B1 | 8/2009 | Cotton et al. |
| 7,663,344 B2 | 2/2010 | Le Gall et al. |
| RE41,676 E | 9/2010 | Yau et al. |
| 7,853,735 B2 | 12/2010 | Jin et al. |
| 7,915,860 B2 | 3/2011 | Quint et al. |
| 7,960,945 B1 | 6/2011 | Onorato et al. |
| 8,054,962 B2 | 11/2011 | Anglin et al. |
| 8,120,321 B2 | 2/2012 | Vezzini et al. |
| 8,126,517 B2 | 2/2012 | Ashbrook et al. |
| 8,135,443 B2 | 3/2012 | Aleksic et al. |
| 8,179,095 B1 | 5/2012 | Onorato et al. |
| 8,237,411 B2 | 8/2012 | Liu et al. |
| 8,250,384 B2 | 8/2012 | Borghetti et al. |
| 8,452,353 B2 | 5/2013 | Crawford |
| 8,581,548 B2 | 11/2013 | Goff et al. |
| 8,599,840 B2 | 12/2013 | Albert et al. |
| 8,665,214 B2 | 3/2014 | Forutanpour et al. |
| 8,751,845 B2 | 6/2014 | Assad et al. |
| 8,762,756 B1 * | 6/2014 | Moy .................... G06F 1/3234 713/321 |
| 8,798,685 B2 | 8/2014 | Stekkelpak et al. |
| 8,813,177 B2 | 8/2014 | Srour et al. |
| 8,872,481 B2 | 10/2014 | Chawla et al. |
| 8,917,061 B2 | 12/2014 | Zhu |
| 8,996,113 B2 | 3/2015 | Ries et al. |
| 9,009,502 B2 | 4/2015 | Udeshi et al. |
| 9,043,085 B2 | 5/2015 | Sisk |
| 9,058,128 B1 | 6/2015 | Robison et al. |
| 9,070,273 B2 | 6/2015 | Lombardi et al. |
| 9,152,202 B2 | 10/2015 | Seinfeld et al. |
| 9,189,055 B2 | 11/2015 | Yang et al. |
| 9,210,662 B1 | 12/2015 | Brown et al. |
| 9,377,839 B2 | 6/2016 | Sasidharan et al. |
| 9,385,557 B2 | 7/2016 | Causey et al. |
| 9,430,280 B1 | 8/2016 | Shih et al. |
| 9,431,828 B2 | 8/2016 | Besser et al. |
| 2003/0042741 A1 | 3/2003 | Hartman et al. |
| 2004/0232892 A1 | 11/2004 | Aradachi et al. |
| 2005/0083016 A1 | 4/2005 | Yau et al. |
| 2005/0275372 A1 | 12/2005 | Crowell |
| 2006/0156045 A1 | 7/2006 | Galles |
| 2006/0184287 A1 * | 8/2006 | Belady .................. G06F 1/3203 700/291 |
| 2007/0083781 A1 | 4/2007 | Aoyagi |
| 2007/0247186 A1 | 10/2007 | Sakata et al. |
| 2008/0055311 A1 | 3/2008 | Aleksic et al. |
| 2008/0201587 A1 | 8/2008 | Lee |
| 2008/0306637 A1 | 12/2008 | Borumand et al. |
| 2009/0088991 A1 | 4/2009 | Brzezowski et al. |
| 2009/0249095 A1 | 10/2009 | Poornachandran et al. |
| 2010/0211804 A1 | 8/2010 | Brumley et al. |
| 2010/0287559 A1 | 11/2010 | Mergen |
| 2010/0304251 A1 | 12/2010 | Chan et al. |
| 2011/0047552 A1 | 2/2011 | Mergen et al. |
| 2011/0159931 A1 | 6/2011 | Boss et al. |
| 2011/0166810 A1 | 7/2011 | Grider et al. |
| 2011/0288898 A1 | 11/2011 | Roe |
| 2012/0072752 A1 * | 3/2012 | Kennedy ............... G06F 1/3206 713/323 |
| 2012/0144219 A1 * | 6/2012 | Salahshour ........... G06F 1/3203 713/322 |
| 2012/0210150 A1 | 8/2012 | de lind van wijngaarden et al. |
| 2012/0210325 A1 | 8/2012 | de Lind van Wijngaarden et al. |
| 2012/0254634 A1 | 10/2012 | Chakra et al. |
| 2012/0260118 A1 | 10/2012 | Jiang et al. |
| 2012/0274279 A1 | 11/2012 | Banos et al. |
| 2012/0274641 A1 | 11/2012 | Diard |
| 2012/0299554 A1 | 11/2012 | Kruglick |
| 2012/0317432 A1 | 12/2012 | Assad et al. |
| 2013/0093391 A1 | 4/2013 | Gale et al. |
| 2013/0176000 A1 | 7/2013 | Bishop et al. |
| 2013/0191662 A1 | 7/2013 | Ingrassia et al. |
| 2013/0231894 A1 | 9/2013 | Paakkonen et al. |
| 2013/0257382 A1 | 10/2013 | Field et al. |
| 2013/0300374 A1 | 11/2013 | Tomita et al. |
| 2014/0042977 A1 | 2/2014 | Kim |
| 2014/0045436 A1 | 2/2014 | Gutierrez, Jr. |
| 2014/0136799 A1 | 5/2014 | Fortin |
| 2014/0195066 A1 | 7/2014 | Nanda et al. |
| 2014/0210265 A1 | 7/2014 | Thorsoe |
| 2014/0281645 A1 | 9/2014 | Sen et al. |
| 2014/0331068 A1 | 11/2014 | Cao |
| 2014/0356656 A1 | 12/2014 | Chen et al. |
| 2015/0048796 A1 | 2/2015 | Sherstyuk et al. |
| 2015/0212560 A1 | 7/2015 | Ueda |
| 2015/0227445 A1 | 8/2015 | Arscott et al. |
| 2015/0277454 A1 | 10/2015 | Carbone et al. |
| 2015/0293575 A1 | 10/2015 | Hampson et al. |
| 2015/0323974 A1 | 11/2015 | Shuster et al. |
| 2015/0347204 A1 | 12/2015 | Stanley-Marbell et al. |
| 2015/0351037 A1 * | 12/2015 | Brown ............... H04W 52/0261 455/574 |
| 2015/0357842 A1 | 12/2015 | Bailly et al. |
| 2016/0034022 A1 | 2/2016 | Sutardja et al. |
| 2016/0073351 A1 | 3/2016 | Cardozo et al. |
| 2016/0077562 A1 | 3/2016 | Smith |
| 2016/0146899 A1 | 5/2016 | Teng et al. |
| 2016/0209906 A1 * | 7/2016 | Chae .................... G06F 1/3206 |
| 2016/0210174 A1 | 7/2016 | Hsieh et al. |
| 2016/0224648 A1 | 8/2016 | Le |
| 2016/0231801 A1 * | 8/2016 | Chandra ............... G06F 1/3212 |
| 2016/0242119 A1 | 8/2016 | Shedletsky et al. |
| 2016/0248266 A1 | 8/2016 | Ferrese et al. |
| 2017/0133867 A1 | 5/2017 | Banos et al. |
| 2017/0346303 A1 | 11/2017 | Vanblon et al. |
| 2017/0371394 A1 * | 12/2017 | Chan ..................... G06F 1/3212 |
| 2018/0123358 A1 | 5/2018 | Prabhakar et al. |
| 2018/0136704 A1 | 5/2018 | Jahagirdar et al. |
| 2018/0136708 A1 | 5/2018 | Jahagirdar et al. |
| 2018/0136709 A1 | 5/2018 | Jahagirdar et al. |
| 2018/0267839 A1 | 9/2018 | Maisuria et al. |
| 2018/0321731 A1 * | 11/2018 | Alfano .................. G06F 1/3231 |
| 2020/0004304 A1 | 1/2020 | Jahagirdar et al. |

FOREIGN PATENT DOCUMENTS

| | | |
|---|---|---|
| EP | 0727728 | 8/1996 |
| JP | 2015100236 A | 5/2015 |
| KR | 20110084768 A | 7/2011 |
| KR | 101521585 B1 | 5/2015 |
| WO | WO-9305560 | 3/1993 |
| WO | WO-2006126022 | 11/2006 |
| WO | WO-2009128079 | 10/2009 |
| WO | WO-2014039311 | 3/2014 |
| WO | 2016032908 A1 | 3/2016 |
| WO | 2016133687 A1 | 8/2016 |

(56) References Cited

FOREIGN PATENT DOCUMENTS

| WO | 2016133688 A1 | 8/2016 |
|---|---|---|
| WO | 2016160748 A1 | 10/2016 |

OTHER PUBLICATIONS

"Non-Final Office Action Issued in U.S. Appl. No. 15/353,596", dated Aug. 31, 2018, 18 Pages.
"Non Final Office Action Issued in U.S. Appl. No. 15/463,918", dated Sep. 21, 2018, 28 Pages.
"International Search Report and Written Opinion Issued in PCT Application No. PCT/US18/033582", dated Aug. 20, 2018, 17 Pages.
"Applicant-Initiated Interview Summary Issued in U.S. Appl. No. 15/340,790", dated Jan. 31, 2019, 3 Pages.
"Non-Final Office Action Issued in U.S. Appl. No. 15/353,548", dated Jan. 7, 2019, 14 Pages.
"Dual Smart Battery System Manager", http://cds.linear.com/docs/en/datasheet/1760fb.pdf, Retrieved on: Oct. 19, 2016, 48 pages.
"Greenify", https://play.google.com/store/apps/details?id=com.oasisfeng.greenify, Oct. 9, 2016, 5 pages.
"GSam Battery Monitor", https://play.google.com/store/apps/details?id=com.gsamlabs.bbm&hl=en, Jul. 11, 2016, 6 pages.
"Watchdog Task Manager Lite", https://play.google.com/store/apps/details?id=com.zomut.watchdoglite, Feb. 5, 2012, 5 pages.
Badam,"Software Defined Batteries", Symposium on Operating Systems Principles (SOSP'15), Oct. 4, 2015, 15 pages.
Gurries,"Monolithic Dual Battery Power Manager Increases Run Time and Decreases Charge Time", In Linear Technology Magazine, Dec. 2001, 6 pages.
Hoffman,"How to See Which Apps Are Draining Your Battery on an Android Phone or Tablet", http://www.howtogeek.com/244748/how-to-see-which-apps-are-draining-your-battery-on-an-android-phone-or-tablet/, Mar. 15, 2016, 6 pages.
Jiang,"Synergetic Control of Power Converters for Pulse Current Charging of Advanced Batteries From a Fuel Cell Power Source", In Journal of IEEE Transactions on Power Electronics, vol. 19, Issue 4, Jul. 2004, pp. 1140-1150.
Rong,"An Analytical Model for Predicting the Remaining Battery Capacity Prediction for Lithium-Ion Batteries", In Proceedings of the conference on Design, Automation and Test in Europe—vol. 1, Mar. 2003, 2 pages.
Weinberger,"Microsoft has a crazy plan to make your batteries last a lot longer", http://www.businessinsider.com.au/microsoft-research-multiple-batteries-for-a-laptop-project-2015-10?r=US&IR=T, Oct. 5, 2015, 9 pages.
Yin,"Pulse-Based Fast Battery IoT Charger Using Dynamic Frequency and Duty Control Techniques Based on Multi-Sensing of Polarization Curve", In Journal of Energies, vol. 9, Issue 3, Mar. 17, 2016, 20 pages.
"International Search Report and Written Opinion Issued in PCT Application No. PCT/US2017/060734", dated Apr. 3, 2018, 12 Pages.
"International Search Report and Written Opinion Issued in PCT Application No. PCT/US2017/060736", dated Apr. 18, 2018, 25 Pages.
"Invitation to Pay Additional Fee Issued in PCT Application No. PCT/US17/060736", dated Feb. 16, 2018, 17 Pages.
"International Search Report and Written Opinion Issued in PCT Application No. PCT/US2017/060733", dated Apr. 25, 2018, 12 Pages.
"International Search Report and Written Opinion Issued in PCT Application No. PCT/US2018/022083", dated Jun. 13, 2018, 17 Pages.
"Non Final Office Action Issued in U.S. Appl. No. 15/340,790", dated Nov. 2, 2018, 16 pages.
Kannan, "Limit Battery Drain on Lollipop by Limiting Background Processes & Killing Apps Activities", http://techtrickz.com/how-to/limit-battery-drain-on-lollipop-by-limiting-background-processes-killing-apps-activities/, Published on Aug. 13, 2015, 7 pages.
Yuan, et al., "GRACE-1: Cross-Layer Adaptation for Multimedia Quality and Battery Energy", In Journal of IEEE Transactions on Mobile Computing, vol. 5, No. 7 , Jul. 2006, p. 799-815.
"Final Office Action Issued in U.S. Appl. No. 15/353,548", dated May 23, 2019, 23 pages.
"Final Office Action Issued in U.S. Appl. No. 15/340,790", dated Jun. 19, 2019, 14 Pages.
"Final Office Action Issued in U.S. Appl. No. 15/353,581", dated Jun. 20, 2019, 25 Pages.
"Final Office Action Issued in U.S. Appl. No. 15/463,918", dated Apr. 19, 2019, 35 Pages.
"Advisory Action Issued in U.S. Appl. No. 15/340,790", dated Sep. 13, 2019, 4 Pages.
"Non Final Office Action Issued in U.S. Appl. No. 15/353,548", dated Oct. 1, 2019, 13 Pages.
"Non Final Office Action Issued in U.S. Appl. No. 15/463,918", dated Dec. 11, 2019, 27 Pages.

* cited by examiner

TARGET BASED POWER MANAGEMENT

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. If power management implemented for a device fails to provide a good battery life, user dissatisfaction with the device and manufacturer may result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a target run-time for a first computing device is obtained. The target run-time indicates how long the first computing device is to run given a current charge in one or more energy storage devices of the first computing device. Based at least in part on the target run-time and the current charge, multiple power management actions to take to allow the first computing device to continue to run for the target run-time are identified. A first of the multiple power management actions is performed in the first computing device, and a second computing device is coordinated with to perform a second of the multiple power management actions.

In accordance with one or more aspects, a first computing device includes an energy storage device system including one or more energy storage devices, a processing system, and a computer-readable storage medium having stored thereon multiple instructions that. The multiple instructions, responsive to execution by the processing system, cause the one or more processors to: obtain a target run-time for the first computing device, the target run-time indicating how long the first computing device is to run given a current charge in the one or more energy storage devices; identify, based at least in part on the target run-time and the current charge, one or more power management actions to take to allow the first computing device to continue to run for the target run-time, the identifying being further based at least in part on usage information from one or more additional computing devices separate from the first computing device; and perform at least one of the one or more power management actions in the first computing device.

In accordance with one or more aspects, a target charge-time for a first computing device is obtained. The target charge-time indicates how long the first computing device is to take to charge one or more energy storage devices of the first computing device. Based at least in part on the target charge-time and a predicted power gain over the target charge-time, one or more power management actions to take to allow the one or more energy storage devices to charge in the target charge-time are identified, and the one or more power management actions are performed in the first computing device

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
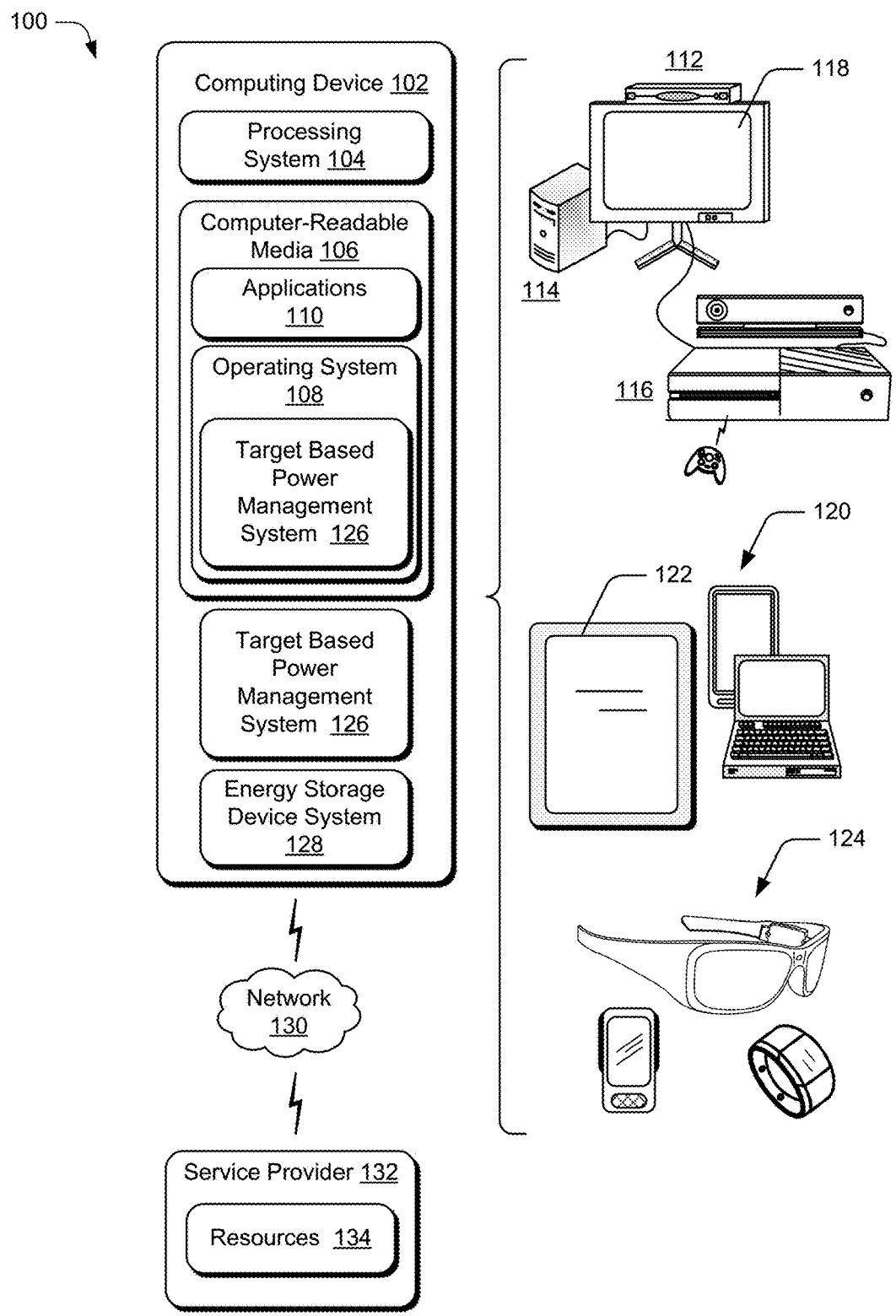
FIG. 1 illustrates an operating environment in accordance with one or more embodiments.

Target based power management is described herein. The target based power management is implemented on a computing device having an energy storage device system with one or more energy storage devices (e.g., batteries). The target based power management includes power management based on target run-times and/or target charge-times.

In one or more embodiments, a target run-time is obtained from user input or is automatically determined. The target run-time refers to how long (e.g., an amount of time, such as a number of minutes, hours, etc.) the computing device is to run given the current amount of energy in the energy storage device(s) of the computing device. A predicted power usage over the target run-time is determined, and what, if any, power management actions to take in order to achieve the target run-time are determined. The power management actions are then taken, such as automatically or in response to user selection of particular power management actions.

Additionally or alternatively, a target charge-time is obtained from user input or is automatically determined. The target charge-time refers to how long (e.g., an amount of time, such as a number of minutes, hours, etc.) the computing device is to take to charge the energy storage device(s) of the computing device to a threshold level (e.g., 100% or fully charged). A predicted power gain over the target charge-time is determined, and what, if any, power management actions to take in order to achieve the target charge-time are determined. The power management actions are then taken, such as automatically or in response to user selection of particular power management actions.

The techniques discussed herein allow a target run-time to be set (e.g., by a user), and the appropriate power management actions are automatically taken to satisfy the target run-time. Usability of the computing device is improved by allowing the user to specify his or her desired target run-time, and various settings or changes are made in the computing device to reduce power usage as appropriate in order to achieve the target run-time. The techniques discussed herein also allow a target charge-time to be set (e.g., by a user), and the appropriate power management actions are automatically taken to satisfy the target charge-time. Usability of the computing device is improved by allowing the user to specify his or her desired target charge-time, and various settings or changes are made in the computing device to reduce the charge time of the energy storage device(s) as appropriate in order to achieve the target charge-time.

In the discussion that follows, a section titled "Operating Environment" is provided and describes one example environment in which one or more implementations can be employed. Following this, a section titled "Target Based Power Management Details" describes example details and procedures in accordance with one or more implementations. Last, a section titled "Example System" describes example computing systems, components, and devices that can be utilized for one or more implementations of dynamic external power resource selection.

Operating Environment

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and optionally one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a rack server or other server computer, a portable computer, a tablet or slate computer, a handheld computer such as a personal digital assistant (PDA), a cell phone, a set-top box, a wearable device (e.g., watch, band, glasses, virtual reality (VR) headsets, augmented reality (AR) headsets, etc.), a home computing device (e.g., a voice-controlled wireless speaker or other smart-home device), an enterprise commodity device (e.g., an automated teller machine (ATM)), other consumer devices (e.g., drones, smart clothing, etc.), and so forth. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, headsets, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 5.

The computer-readable media 106 can include, by way of example and not limitation, all forms of volatile and non-volatile memory and/or storage media that are typically associated with a computing device. Such media can include ROM, RAM, flash memory, hard disk, removable media, storage-class memory (SCM) such as 3D Xpoint memory available from Intel Corporation of Santa Clara, Calif. or Micron Technology, Inc. of Boise, Id., and the like. Computer-readable media can include both "computer-readable storage media" and "communication media," examples of which can be found in the discussion of the example computing system of FIG. 5.

The computing device 102 also includes a target based power management system 126 and an energy storage device system 128 that operate as described above and below. The target based power management system 126 can be implemented as part of the operating system 108, can be implemented as separate from the operating system 108, or can be implemented in part by the operating system 108 and in part separate from the operating system 108. The target based power management system 126 can optionally be implemented as one or more discreet systems 126 working in concert. The energy storage device system 128 is configured to include one or more energy storage devices as discussed in greater detail below. The target based power management system 126 and energy storage device system 128 may be provided using any suitable combination of hardware, software, firmware, and/or logic devices. As illustrated, the target based power management system 126 and energy storage device system 128 may be configured as separate, standalone systems. In addition or alternatively, the target based power management system 126 may also be configured as a system or module that is combined with the operating system 108 or implemented via a controller or other component of the energy storage device system 128.

The target based power management system 126 represents functionality operable to manage power usage in the computing device 102 to achieve a desired target run-time and/or target charge-time given the energy storage device system 128. The target run-time refers to how long (e.g., an amount of time, such as a number of minutes, hours, etc.) the computing device 102 is to run given the current amount of energy in the energy storage device(s) of the energy storage device system 128. The target charge-time refers to how long (e.g., an amount of time, such as a number of minutes, hours, etc.) the computing device 102 is to take to charge the energy storage device(s) of the energy storage device system 128 to a threshold level (e.g., 100% or fully charged). This managing of power usage in the computing device 102 may involve analyzing various usage information and other data, as discussed in more detail below.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of dynamic external power resource selection.

Target Based Power Management Details

To further illustrate, consider the discussion in this section of example devices, components, procedures, and implementation details that may be utilized to provide dynamic external power resource selection as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
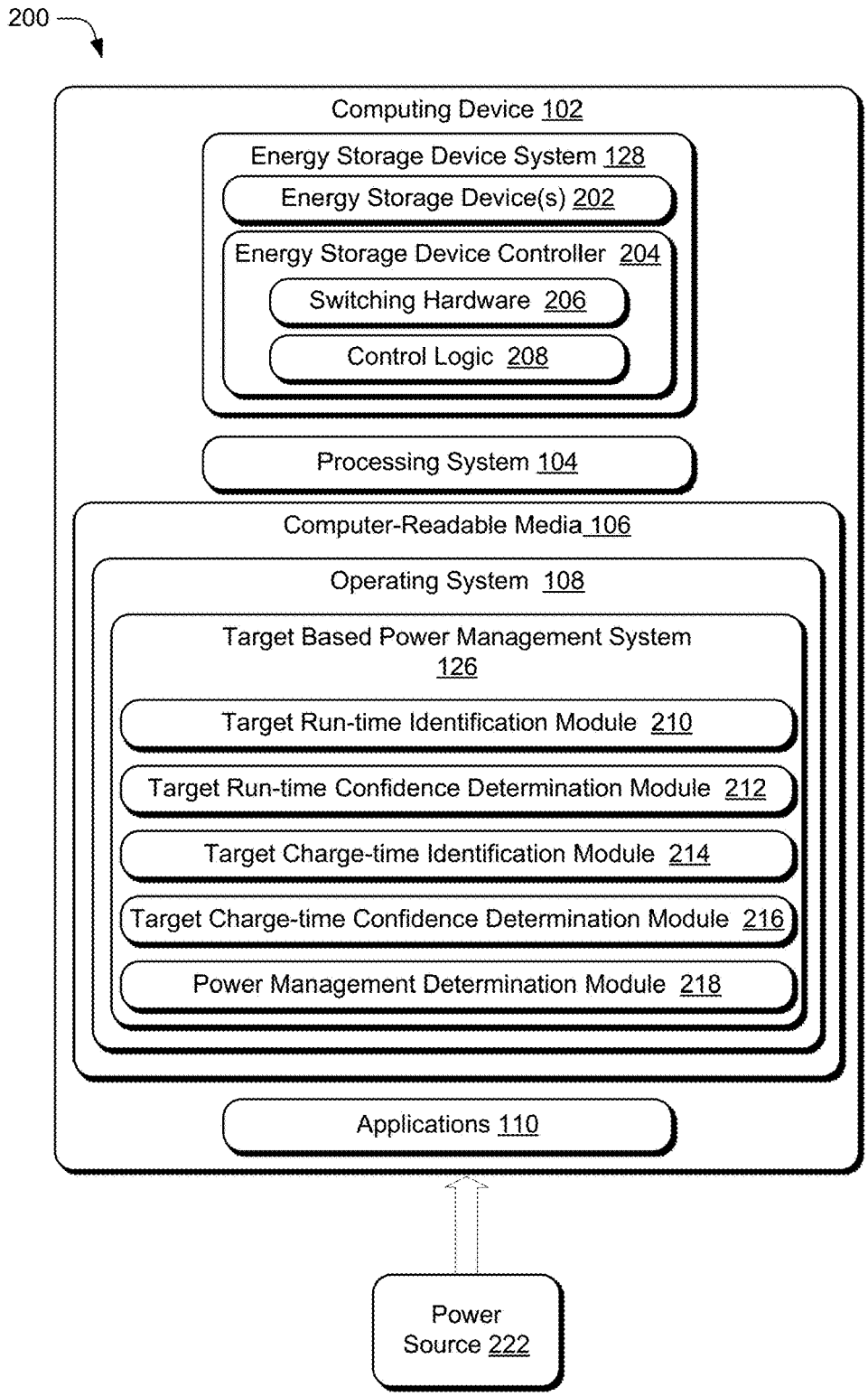
FIG. 2 depicts example details of a computing device having an energy storage device system with one or more energy storage devices in accordance with one or more implementations.

FIG. 2 depicts generally at 200 example details of a computing device 102 having an energy storage device system 128 with one or more energy storage devices 202 in accordance with one or more implementations. Computing device 102 also includes processing system 104, computer readable media 106, operating system 108 and applications 110 as discussed in relation to FIG. 1. In the depicted example, a target based power management system 126 is also shown as being implemented as a component of the operating system 108. It should be noted, however, that the target based power management system 126 can alternatively be implemented in other manners. For example, parts of (or all of) the target based power management system 126 can be implemented as part of the energy storage device system 128.

By way of example and not limitation, the energy storage device system 128 is depicted as having one or more energy storage devices 202 and an energy storage device controller 204. The energy storage device(s) 202 are representative of various different kinds of energy storage devices that may be included and/or compatible with the computing device 102. These energy storage devices can include, for example, individual or a collection of battery cells, supercapacitors, and so forth. Energy storage devices 202 can include energy storage devices that are designed to be included in and specifically work with the computing device 102 at the time of manufacture or distribution, and/or external energy storage devices (e.g., original equipment manufacturer (OEM) manufactured external batteries) that are added to the computing device 102 (e.g., by the user) at a later point in time. It should be noted that these energy storage devices include various devices that store energy as opposed to being an external AC power resource. Energy storage device(s) 202 can include a single energy storage device, or alternatively multiple energy storage devices having different characteristics such as different sizes, capacities, chemistries, battery technologies, shapes, age, cycles, temperature, and so forth (heterogeneous energy storage devices). Accordingly, the energy storage device system 128 can optionally include a diverse combination of multiple energy storage devices at least some of which can have different characteristics one to another. Alternatively, the energy storage device(s) 202 can include multiple energy storage devices having the same characteristics, or a single energy storage device. Various combinations of energy storage device(s) 202 may be utilized to provide a range of capacities, performance capabilities, efficiencies, power usage characteristics, and utilization of space in the device (e.g., for the purpose of balancing the weight, increasing energy storage capacity and/or energy storage characteristics), and so forth.

The energy storage device controller 204 is representative of a control system to control operation of the energy storage device system 128, to control delivery of power from the energy storage device(s) 202 to service a system load of the computing device 102, and to control delivery of power from a power source 222 to the energy storage device(s) 202 to charge the energy storage device(s) 202. The system load refers to the energy used by the computing device 102 at any given point in time in order to operate. The energy storage device controller 204 may be configured using various logic, hardware, circuitry, firmware, and/or software suitable to connect the energy storage device(s) 202 one to another, supply power to the system, switch between the energy storage devices, and so forth. By way of example and not limitation, the energy storage device controller 204 in FIG. 2 is depicted as including switching hardware 206 and control logic 208 that is operable to selectively switch between use of different designated sources of the energy storage device(s) 202 at different times. Control logic 208 may reflect different switching modes that switch between charging different ones of the energy storage device(s) 202 so that power is provided to ones of the energy storage device(s) 202 based on various criteria as determined by the target based power management system 126. Thus, rather than merely interconnecting energy storage devices in parallel or series, switching hardware 206 can be utilized to set-up a switching scheme to select different energy storage devices based on different criteria for the computing device 102.

The computing device 102 can be connected to various different power sources 222. Although a single power source 222 is shown in FIG. 2, the computing device 102 can be connected to any number of power sources. A power source refers to a source of power, typically AC power, that can be connected to the computing device 102. Power source 222 can be connected to the computing device 102 via a wired connection and/or a wireless connection. The power source 222 is external to the computing device 102. The power source 222 is separate from the energy storage devices 202 and is used to charge the energy storage devices 202.

It should be noted that although reference is made herein to an AC (Alternating Current) power source, DC (Direct Current) power is drawn from that power source (e.g., the AC power source). Furthermore, in some cases power is drawn in other manners, such as a wireless power source that transmits power as magnetized waves. The techniques discussed herein apply regardless of the nature of the power sources.

The target based power management system 126 includes a target run-time identification module 210, a target run-time confidence determination module 212, a target charge-time identification module 214, a target charge-time determination module 216, and a power management determination module 218.

The target run-time identification module 210 determines a target run-time for the computing device 102. The target run-time, as discussed above, refers to how long (e.g., an amount of time, such as a number of minutes, hours, etc.) the computing device 102 is to run given the current amount of energy in the energy storage device(s) of the energy storage device system 128. For example, the user of the computing device 102 can provide an input indicating that he or she desires to have the computing device 102 run for 2 hours using the current amount of energy in the energy storage device(s) 202, in which case the target run-time is 2 hours.

The target run-time can be obtained in any of a variety of different manners. In one or more embodiments, the target run-time is received as a user input. The user input can be received in any of a variety of different manners, such as input via a graphical user interface (e.g., selection of one or more keys or buttons, setting a value along a slider), via a touchscreen (e.g., a gesture, selection of keys on a soft keyboard), audible inputs, gestures observed by a camera or other sensing device, and so forth. The user input can specify the target run-time as an amount of time (e.g., a number of hours or minutes) and/or in other manners. For example, the user input can specify the target run-time as an amount of time for a particular application or operating system program to finish running, an amount of time for a particular application or operating system program to finish a particular task (e.g., transcribing a particular audio recording), and so forth.

Additionally or alternatively, the target run-time can be determined from various additional information available to the target run-time identification module 210. In one or more embodiments, the target run-time is determined based on previous experience or operation of the computing device 102. The target based power management system 126 can maintain a record of various usage information for the computing device 102, such as when the computing device 102 is powered on (or transitioned out of a sleep or low power mode), when the computing device 102 is powered off (or transitioned into a sleep or low power mode), when the computing device 102 is connected to a power source 222, and so forth. This usage information can be recorded for different times during the day as well as different days, and used by the target run-time identification module 210 to determine the target run-time. The target run-time identification module 210 can assume that the computing device 102 will be powered on, powered off, and/or connected to a power source 222 at approximately the same time as the computing device 102 is typically powered on, powered off, and/or connected to a power source 222. For example, if the current time is 2:00 pm and the recorded information indicates that the computing device 102 is typically powered off at 5:00 pm, then the target run-time identification module 210 can determine that the target run-time is 3 hours. By way of another example, if the current time is 9:30 pm and the recorded information indicates that the computing device 102 is typically connected to a power source 222 at 11:00 pm, then the target run-time identification module 210 can determine that the target run-time is 90 minutes.

The usage information recorded by the target based power management system 126 can also optionally include the location of the computing device 102. This location of the computing device 120 can be a geographic location that is determined by a location awareness module in a variety of different manners, such as obtained from a Global Positioning System (GPS), determined by analyzing Wi-Fi signals received by the computing device 102, determined by receiving location information from short-range transmitters or beacons (e.g., RF (Radio Frequency) beacons, Bluetooth low energy beacons), and so forth. This location of the computing device 120 can also be a type or category of location where the computing device 102 is currently situated, such as at work, at home, on a plane, etc. The type or category of a location where the computing device 102 is currently situated can be determined in different manners, such as the name (e.g., Service Set Identifier (SSID)) of a Wi-Fi network the computing device 102 is coupled to (e.g., the computing device 102 can be programmed or otherwise configured with indications of which types or categories of locations correspond to which Wi-Fi network names), whether the computing device 102 is set in an airplane mode, and so forth.

By including location information, the target run-time identification module 210 can determine the target run-time further based on a current location of the computing device 102. Given a current location of the computing device 102, the target run-time identification module 210 can assume that the computing device 102 will be powered on, powered off, and/or connected to a power source 222 at approximately the same time as the computing device 102 is typically powered on, powered off, and/or connected to a power source 222 when at that location. For example, if the current time is 4:00 pm, the current location is "work", and the recorded information indicates that the computing device 102 is typically powered off at 5:00 pm when at the location "work", then the target run-time identification module 210 can determine that the target run-time is 1 hour. By way of another example, if the current time is 4:00 pm, the current location is "home", and the recorded information indicates that the computing device 102 is typically powered off at 10:00 pm when at the location "home", then the target run-time identification module 210 can determine that the target run-time is 6 hours.

In one or more embodiments, the target run-time is determined based on upcoming events or activities. Upcoming events refer to events occurring within a threshold amount of time of a current time (e.g., within a particular number of minutes or hours), events occurring prior to a particular time (e.g., before midnight, before 10:00 pm), and so forth. Upcoming events can be identified in various manners, such as based on information included in a calendar of the user of the computing device 102 (e.g., meeting or appointments of the user), information included in a digital personal assistant (e.g., the Cortana® personal assistant), and so forth. For example, if the current time is 4:00 pm and an upcoming event is a dinner meeting scheduled for 6:00 pm, then the target run-time identification module 210 can determine that the target run-time is 2 hours, assuming that the computing device 102 will be powered down or otherwise not used during the dinner meeting. By way of another example, if the current time is 4:00 pm and an upcoming event is a videoconference scheduled to run from 6:00 pm to 7:00 pm, then the target run-time identification module 210 can determine that the target run-time is 3 hours, assuming that the computing device 102 will be powered on through the videoconference.

Additionally or alternatively, the target run-time identification module 210 can determine the target run-time from various additional information regarding previous experience or operation of other computing devices (computing devices other than the computing device 102). Each of multiple additional computing devices can identify its own usage information analogous to the usage information identified by the computing device 102 as discussed above. This usage information for the multiple additional computing devices can be collected at a service (e.g., accessed via a network such as the Internet) that is accessible to the computing device 102, or can otherwise be provided to the computing device 102. The target run-time identification module 210 can use this usage information for the multiple additional computing devices analogous to the usage information for the computing device 102 discussed above. For example, if the current time is 4:00 pm, the current location is "work", and the recorded information indicates that the multiple additional computing devices are typically powered off at 5:00 pm when at the location "work", then the target run-time identification module 210 can determine that the target run-time is 1 hour.

In one or more embodiments, many different computing devices provide usage information to a service, and the target run-time identification module 210 uses information from a subset of those many different computing devices as the multiple additional computing devices to determine the target run-time. This allows the target run-time identification module 210 to automatically determine target run-times that are more accurate due to the larger amount of information that is relied on (rather than just he usage information of a single computing device). Which computing devices are included in this subset can be determined in a variety of different manners. In one or more embodiments, computing devices that are the same types of devices as the computing device 102 (e.g., the same make and model, the same form factor) can be included in this subset. Additionally or alternatively, computing devices being used by users having the same characteristics as the user of the computing device 102 (e.g., the same job title or classification, the same age range or gender) can be included in this subset. Additionally or alternatively, computing devices that have the same location as the computing device 102 (e.g., the same type or category of location, within a threshold distance (e.g., 1000 feet) of the geographical location of the computing device 102) can be included in this subset.

In situations where information is obtained from multiple additional computing devices, the information can be combined in any of a variety of different manners. In one or more embodiments, the information from the multiple additional computing devices is averaged together. Alternatively, the information from the multiple additional computing devices can be combined in other manners (e.g., using a weighted averaging, picking a mean value, picking a highest or lowest value). For example, assume that the current time is 4:00 pm, the current location is "work", and the recorded information indicates that one of the multiple additional computing devices is typically powered off at 5:00 pm when at the location "work", another of the multiple additional computing devices is typically powered off at 4:50 pm when at the location "work", and another of the multiple additional computing devices is typically powered off at 4:40 pm when at the location "work". The target run-time identification module 210 can average these three times together resulting in an average time that the multiple additional computing devices are typically powered off being 4:50 pm when at the location "work", and determine that the target run-time is 50 minutes.

It should be noted that, in situations in which information from multiple different computing devices is used and/or characteristics of a user are used to determine which computing devices are included in the multiple computing devices, such information can be obtained or used only after receiving user consent to collect or otherwise use such information. This user consent can be an opt-in consent (e.g., the information is collected or use if the user selects to have the information collected or used), or an opt-out consent (e.g., the information is collected or used unless the user selects to not use have the information collected or used). Any such information that is collected or used can also be anonymized so as not to identify a particular user. For example, information regarding usage information of the multiple additional computing devices can be collected at the service without the service maintaining any information regarding the identity of the particular users of those multiple additional computing devices.

The target run-time confidence determination module 212 obtains the target run-time determined by the target run-time identification module 210 and determines the confidence level that the target based power management system 126 will be able to achieve the target run-time. This confidence level can be indicated in various manners, such as a percentage (e.g., a value 0% to 100%, such as a 70% chance of achieving the target run-time), a category or classification (e.g., one of multiple different confidences, such as low confidence, medium confidence, or high confidence). Generally, the target run-time confidence determination module 212 determines a predicted power usage over the target run-time, and then determines what, if any, power management actions can be taken in order to achieve the target run-time.

The target run-time confidence determination module 212 determines a predicted power usage over the target run-time. The target run-time confidence determination module 212 can estimate or predict the expected power usage over the target run-time in a variety of different manners. The target run-time confidence determination module 212 estimates or predicts the expected power usage of the computing device 102 over the target run-time based on location and/or expected user activity. In one or more embodiments, the target run-time confidence determination module 212 maintains a record (e.g., over a matter of weeks or months) indicating times of the day and/or days of the week and the power usage during those times and/or days. From this record, the target run-time confidence determination module 212 can identify usage patterns that indicate power usage of the computing device 102. Any of a variety of public and/or proprietary techniques can be used to analyze the record to identify usage patterns based on time and/or day. Additionally or alternatively, the target run-time confidence determination module 212 maintains a record of applications run on the computing device 102 and the power usage while those applications are run. From this record, the target run-time confidence determination module 212 can identify usage patterns that indicate power usage of the computing device 102 based on application(s) running. Any of a variety of public and/or proprietary techniques can be used to analyze the record to identify usage patterns.

For example, if every Wednesday (or at least a threshold number of Wednesdays, such as 75%) from 8:00 am to 10:00 am a particular amount of power (e.g., 1200 milliwatt hours (mWh)) is used, then the target run-time confidence determination module 212 can predict that on the following Wednesday from 8:00 am to 10:00 am the computing device will use that same particular amount of power (e.g., 1200 mWh). By way of another example, if every day of the week (or at least a threshold number of days, such as 80%) from noon to 1:00 pm the computing device uses a particular amount of power (e.g., 30 mWh), then the target run-time confidence determination module 212 can predict that, if it is currently noon, the computing device will use 30 mWh from noon to 1:00 pm today. By way of yet another example, if every time (or at least a threshold number of times, such as 70%) an image processing application is run on the computing device the computing device uses 1000 milliwatts per hour (mW/h), then the target run-time confidence determination module 212 can predict that, if that image processing is currently running on the computing device then the computing device will currently use 1000 mW/h.

Additionally or alternatively, the target run-time confidence determination module 212 can estimate or predict the power usage of the computing device 102 based on any of a variety of other data. The target run-time confidence determination module 212 can obtain data from various different sources and analyze the data using any of a variety of public and/or proprietary techniques to identify expected future usage patterns.

By way of example, the target run-time confidence determination module 212 can obtain data from a calendar of the user of the computing device 102. The past usage data (the record indicating times of the day and/or days of the week and the power usage during those times and/or days) can be compared to the user's calendar and a determination made that during meetings (or meetings at particular locations) the computing device uses a particular amount of power (e.g., 50 mW/h). The target run-time confidence determination module 212 can predict, for example, that the computing device will also use 50 mW/h during upcoming meetings (or meetings at particular locations) identified in the user's calendar, or more than 50 mW/h (e.g., 70 mW/h) if the user is marked as meeting presenter.

By way of example, the target run-time confidence determination module 212 can obtain data from a calendar and/or digital personal assistant (e.g., the Cortana® personal assistant) of the user of the computing device 102. The target run-time confidence determination module 212 can predict, given this obtained data, when the user will be away from the computing device 102 (e.g., for a meeting, for coffee, etc.). The target run-time confidence determination module 212 can further predict, for example, that the computing device will use a small amount of power (e.g., 5 mW/h) while the user is away from the computing device 102.

By way of example, the target run-time confidence determination module 212 can obtain location data for the computing device 102, such as from a location awareness module of the computing device 102. The past usage data (the record indicating times of the day and/or days of the week and the power usage during those times and/or days) can be compared to the user's locations and a determination made that at certain locations (e.g., home) the computing device uses a particular amount of power (e.g., 100 mW/h). The target run-time confidence determination module 212 can predict, for example, that the computing device will also use 100 mW/h when the user is next at home.

By way of example, the target run-time confidence determination module 212 can obtain data from a service (e.g., via the Internet) that collects usage data for multiple additional computing devices. The service can provide an indication of times of the day and/or days of the week and the power usage during those times and/or days for those additional computing devices (or a subset of those additional computing devices that are of the same type as the computing device 102, that are being used by users having have the same characteristics as the user of the computing device 102, that have the same location as the computing device 102, etc. analogous to the discussion above). The target run-time confidence determination module 212 can predict, for example, that the computing device will use similar or the same amount of power during those times of the day and/or days of the week indicated by the service.

Given the target run-time and the predicted power usage over the target run-time, the target run-time confidence determination module 212 determines what, if any, power management actions can be taken in order to achieve the target run-time. If the current amount of energy stored in the energy storage device(s) 202 is sufficient to meet the predicted power usage over the target run-time, then no power management actions need be taken. However, if the current amount of energy stored in the energy storage device(s) 202 is not sufficient to meet the predicted power usage over the target run-time, then one or more power management actions are taken to reduce power usage over the target run-time in an attempt to allow the computing device 102 to run for the duration of the target run-time given the amount of energy stored in the energy storage device(s) 202.

Various different power management actions can be taken by the target run-time confidence determination module 212. In one or more embodiments, the power management actions include changes to display settings of the computing device 102. Examples of changes to display settings of the computing device 102 include reducing or limiting the brightness of a display device, reducing or limiting the display resolution of a display device, adjusting a color scheme of a display device (e.g., reducing the number of colors displayed and/or which colors are displayed), combinations thereof, and so forth.

In one or more embodiments, the power management actions include changes to processor settings of the computing device 102. Examples of changes to processor settings of the computing device 102 include reducing or limiting CPU power consumption, reducing or limiting graphics processing unit (GPU) frequency and/or turbo ranges, combinations thereof, and so forth.

In one or more embodiments, the power management actions include changes to the programs running on the computing device 102. Examples of changes to the programs running on the computing device 102 include reducing the level or amount of work and tasks performed by programs running on the computing device 102 (e.g., deferring background tasks to a later time, such as after the target run-time elapses), reducing the number of programs running on the computing device 102 (e.g., deferring programs performing background tasks or operations to a later time, such as after the target run-time elapses), combinations thereof, and so forth.

In one or more embodiments, the power management actions include changes to features available on the computing device 102. Examples of changes to features available on the computing device 102 include limiting the ability of a user of the computing device 102 to access features available on the computing device 102, such as preventing the user from performing large (e.g., greater than a threshold amount, such as 100 megabytes) data downloads, preventing the user from using the computing device 102 to charge other devices, combinations thereof, and so forth.

In one or more embodiments, the power management actions include turning off devices that are part of or powered by the computing device 102. Examples of turning off devices that are part of or powered by the computing device 102 include turning off a display device of the computing device 102 more quickly (e.g., if a typical setting of the computing device 102 is to turn off the display device after a threshold amount of time (e.g., 5 minutes) has elapsed with no user input, reduce that to a second threshold amount of time that is lower (e.g., 30 seconds)), entering a hibernate or other power saving mode of the computing device 102 more quickly (e.g., if a typical setting of the computing device 102 is to enter a power saving mode after a threshold amount of time (e.g., 10 minutes) has elapsed with no user input, reduce that to a second threshold amount of time that is lower (e.g., 2 minutes)), combinations thereof, and so forth.

In one or more embodiments, the power management actions include shutting down or powering down particular devices of the computing device 102. These particular devices are, for example, devices that have not been used within a threshold amount of time (e.g., 5 minutes). Examples of shutting down or powering down particular devices of the computing device 102 include powering down location awareness devices (e.g., a GPS device that is included in the computing device 102), powering down communication devices (e.g., a Bluetooth or infrared (IR) communication device that is included in the computing device 102), combinations thereof, and so forth.

In one or more embodiments, the power management actions include coordinating with one or more additional devices to perform the operations of the computing device 102. Examples of coordinating with one or more additional devices to perform the operations of the computing device 102 include offloading or transferring operations to another computing device such as a server or other service accessed via the Internet (e.g., communicating with another computing device informing the other computing device to run particular applications rather than running the applications on the computing device 102), offloading or transferring operations or functionality to another device in close physical proximity (e.g., within a threshold distance, such as 10 feet) to the computing device 102 (e.g., transfer data for display to a wearable device of the user rather than powering on the display of the computing device 102 to display the data, run particular applications on a wearable device of the user rather than on the computing device 102), combinations thereof, and so forth.

Each power management action has an associated power savings. For example, limiting CPU power consumption over at least part of the target run-time will reduce the power usage in the computing device 102 by some amount relative to not limiting the CPU power consumption. This reduced power usage is the power savings associated with the power management action of limiting CPU power consumption.

The target run-time confidence determination module 212 can determine the power savings associated with each power management action in any of a variety of different manners. In one or more embodiments, the power savings associated with the various power management actions can be provided by a developer or manufacturer of the computing device 102, by a developer or manufacturer of hardware used in the computing device 102, and so forth. The power savings can be provided by a developer or manufacturer in various manners, such as by providing a data file to the target run-time confidence determination module 212, pre-configuring the target run-time confidence determination module 212 with the power savings, making the power savings available to the target run-time confidence determination module 212 via a service (e.g., accessed via the Internet), and so forth.

Additionally or alternatively, the power savings associated with the various power management actions can be learned by the target run-time confidence determination module 212 through observation of the computing device 102. Various different data can be used to predict the power usage of the computing device 102 as discussed above. This same information can be used to predict the power savings associated with various different power management actions. For example, data regarding power used by a CPU when running at two different power consumption levels (e.g., two different power settings, two different frequency ranges, etc.) can be used to determine the power savings associated with limiting power consumption by the CPU.

Additionally or alternatively, the target run-time confidence determination module 212 can obtain data from a service (e.g., via the Internet) that collects usage data for multiple additional computing devices as discussed above. The service can provide an indication of power savings associated with various power management actions as determined by the multiple additional computing devices (or a subset of those additional computing devices that are of the same type as the computing device 102, that are being used by users having have the same characteristics as the user of the computing device 102, that have the same location as the computing device 102, etc. analogous to the discussion above). The target run-time confidence determination module 212 can assume, for example, that the power savings associated with power management actions in the computing device 102 will be similar or the same as the power savings associated with power management actions in the subset of those additional devices.

The target run-time confidence determination module 212 identifies which one or more power management actions can be taken to achieve sufficient power savings so that the target run-time can be satisfied. Given the variety of different power management actions that can be taken, situations can arise in which various different combinations of power management actions can be used to achieve sufficient power savings so that the target run-time can be satisfied.

In one or more embodiments, the target run-time confidence determination module 212 identifies multiple sets of power management actions that can be taken to achieve sufficient power savings so that the target run-time can be satisfied and associates each set with a confidence level. The target run-time confidence determination module 212 can determine a confidence level for a set of power management actions that indicates the confidence that the target based power management system 126 has in (or the probability that) the set of power management actions achieving sufficient power savings so that the target run-time is satisfied in any of a variety of different manners.

In one or more embodiments, the target run-time confidence determination module 212 determines a confidence level for a set of power management actions based on how much data is available to use for determining how much power savings can be obtained for each of the power management actions. For example, if usage information for only the computing device 102 is available and includes only 4 instances of power savings obtained by entering a hibernate or other power saving mode of the computing device 102 more quickly, then the confidence level would be lower (e.g., a confidence level of 50%) than if 50 instances of power savings obtained by entering a hibernate or other power saving mode of the computing device 102 more quickly were available (e.g., a confidence level of 75%).

Usage information can also be weighted differently based on the type of information and/or the source of the information. For example, usage information regarding the computing device 102 itself may be weighted more heavily than usage information regarding additional computing devices obtained from a service. By way of another example, usage information regarding power used by a CPU when running at two different power consumption levels can be weighted more heavily than usage information regarding power savings obtained by entering a hibernate or other power saving mode of the computing device 102 more quickly.

The confidence level can also be determined at least in part based on the duration of the target run-time. The target run-time confidence determination module 212 can assume that power savings over shorter amounts of time (shorter target run-times) have higher confidence levels than power savings over longer amounts of time (longer target run-times).

In one or more embodiments, the confidence level of each power management action is pre-determined and accessible to the target run-time confidence determination module 212. The target run-time confidence determination module 212 can be pre-configured with these confidence levels for the power management actions, can obtain the confidence levels for the power management actions from a service (e.g., via the Internet), and so forth.

In one or more embodiments, the confidence levels of the individual power management actions in a set of power management actions are combined to determine the confidence level for that set of power management actions. The confidence levels of the individual power management actions can be combined in different manners, such as averaging the confidence levels, performing a weighted averaging of the confidence levels, selecting a lowest (or alternatively highest) confidence level, and so forth.

The power management determination module 218 obtain one or more sets of power management actions from the target run-time confidence determination module 212 and performs the power management actions in one of those one or more sets (e.g., changes settings in the computing device 102 to turn off a display device of the computing device 102 more quickly, changes processor settings of a processor the computing device 102, etc.). In one or more embodiments, the power management determination module 218 automatically selects a set of power management actions and performs those power management actions. The power management determination module 218 can determine which of the multiple sets of power management actions to select in various different manners, such as selecting the set of power management actions having the highest confidence level, the set of power management actions having the lowest confidence level that still satisfies a threshold value (e.g., 70%), and so forth.

Additionally or alternatively, the power management determination module 218 can display different sets of power management actions to the user and receive a user selection of one of the sets. The different power management actions in each set, as well as the confidence level of each set, are optionally displayed as well. This allows the user to select the power management actions that he or she desires, allowing the user to take into account confidence levels, specific power management actions, and so forth. For example, the power management actions included in a set that has a confidence level of 98% may be unacceptable to the user, in which case the user can select a set having a lower confidence level (e.g., 80%), knowing that the computing device 102 is less likely to achieve the target run-time but still allowing the computing device 102 to run without having unacceptable power management actions implemented.

The target charge-time identification module 214 determines a target charge-time for the computing device 102. The target charge-time, as discussed above, refers to how long (e.g., an amount of time, such as a number of minutes, hours, etc.) the computing device 102 is to take to charge the energy storage device(s) of the energy storage device system 128 to a desired threshold level. This threshold level can be fully charged (e.g., 100%), or some other charge level (e.g., 80% of the full capacity of the energy storage device(s) 202). For example, the user of the computing device 102 can provide an input indicating that he or she desires to have the computing device 102 charged in 45 minutes, in which case the target charge-time is 2 hours.

The target charge-time can be obtained in any of a variety of different manners. In one or more embodiments, the target charge-time is received as a user input. The user input can be received in any of a variety of different manners, such as input via a graphical user interface (e.g., selection of one or more keys or buttons, setting a value along a slider), via a touchscreen (e.g., a gesture, selection of keys on a soft keyboard), audible inputs, gestures observed by a camera or other sensing device, and so forth. The user input can specify the target charge-time as an amount of time (e.g., a number of hours or minutes) and/or in other manners. For example, the user input can specify the target charge-time with relation to one or more events (e.g., a user input specifying that the user desires to have the computing device 102 charged before he or she leaves, which can be determined by the target charge-time identification module 214 by an entry in a calendar of the user, by a digital personal assistant, and so forth.

Additionally or alternatively, the target charge-time can be determined from various additional information available to the target run-time identification module 210. In one or more embodiments, the target charge-time is determined based on previous experience or operation of the computing device 102. The target based power management system 126 can maintain a record of various usage information for the computing device 102, such as when the computing device 102 is powered on (or transitioned out of a sleep or low power mode), when the computing device 102 is powered off (or transitioned into a sleep or low power mode), when the computing device 102 is connected to a power source 222, when the computing device 102 is disconnected from a power source 222, and so forth as discussed above. This usage information can be recorded for different times during the day as well as different days, and used by the target charge-time identification module 214 to determine the target charge-time. The target charge-time identification module 214 can assume that the computing device 102 will be powered on, powered off, connected to a power source 222, and/or disconnected form a power source 222 at approximately the same time as the computing device 102 is typically powered on, powered off, connected to a power source 222, and/or disconnected form a power source 222. For example, if the current time is 2:00 pm and the computing device is connected to a power source 222, and the recorded information indicates that the computing device 102 is typically disconnect from a power source 222 at 2:30 pm, then the target charge-time identification module 214 can determine that the target charge-time is 30 minutes.

The usage information recorded by the target based power management system 126 can also optionally include the location of the computing device 102. This location of the computing device 120 can be a geographic location that is determined by a location awareness module, and can also be a type or category of location where the computing device 102 is currently situated, such as at work, at home, on a plane, etc., as discussed above. By including location information, the target charge-time identification module 214 can determine the target charge-time further based on a current location of the computing device 102. Given a current location of the computing device 102, the target charge-time identification module 214 can assume that the computing device 102 will be powered on, powered off, connected to a power source 222, and/or disconnected from a power source 222 at approximately the same time as the computing device 102 is typically powered on, powered off, connected to a power source 222, and/or disconnected from a power source 222 when at that location. For example, if the current time is 4:00 pm, the current location is "work", and the recorded information indicates that the computing device 102 is typically disconnected from a power source at 5:00 pm when at the location "work", then the target charge-time identification module 214 can determine that the target charge-time is 1 hour. By way of another example, if the current time is 10:00 pm, the current location is "home", and the recorded information indicates that the computing device 102 is typically disconnected from a power source at 6:00 am when at the location "home", then the target charge-time identification module 214 can determine that the target charge-time is 8 hours.

In one or more embodiments, the target charge-time is determined based on upcoming events or activities. Upcoming events refer to events occurring within a threshold amount of time of a current time (e.g., within a particular number of minutes or hours), events occurring prior to a particular time (e.g., before midnight, before 10:00 pm), and so forth. Upcoming events can be identified in various manners, such as based on information included in a calendar of the user of the computing device 102 (e.g., meeting or appointments of the user), information included in a digital personal assistant (e.g., the Cortana® personal assistant), and so forth. For example, if the computing device 102 is connected to a power source 222, the current time is 11:00 am and an upcoming event is leaving at 11:45 am for a lunch meeting, then the target charge-time identification module 214 can determine that the target charge-time is 45 minutes, assuming that the computing device 102 will be disconnected from the power source 222 for the user to take to the lunch meeting.

Additionally or alternatively, the target charge-time identification module 214 can determine the target charge-time from various additional information regarding previous experience or operation of other computing devices (computing devices other than the computing device 102). Each of multiple additional computing devices can identify its own usage information analogous to the usage information identified by the computing device 102 as discussed above. This usage information for the multiple additional computing devices can be collected at a service (e.g., accessed via a network such as the Internet) that is accessible to the computing device 102, or can otherwise be provided to the computing device 102. The target run-time identification module 210 can use this usage information for the multiple additional computing devices analogous to the usage information for the computing device 102 discussed above. For example, if the computing device 102 is connected to a power source 222, the current time is 4:00 pm, the current location is "work", and the recorded information indicates that the multiple additional computing devices are typically disconnected from a power source at 4:50 pm when at the location "work", then the target charge-time identification module 214 can determine that the target charge-time is 50 minutes.

In one or more embodiments, many different computing devices provide usage information to a service, and the target run-time identification module 210 uses information from a subset of those many different computing devices as the multiple additional computing devices to determine the target run-time. Which computing devices are included in this subset can be determined in a variety of different manners analogous to the discussion above regarding target run-times. In situations where information is obtained from multiple additional computing devices, the information can be combined in any of a variety of different manners analogous to the discussion above regarding target run-times.

The target charge-time confidence determination module 216 obtains the target charge-time determined by the target charge-time identification module 214 and determines the confidence level that the target based power management system 126 will be able to achieve the target charge-time. This confidence level can be indicated in various manners, such as a percentage (e.g., a value 0% to 100%, such as a 70% chance of achieving the target run-time), a category or classification (e.g., one of multiple different confidences, such as low confidence, medium confidence, or high confidence). Generally, the target charge-time confidence determination module 216 determines a predicted power gain over the target charge-time, and then determines what, if any, power management actions can be taken in order to achieve the target charge-time.

The target charge-time confidence determination module 216 determines a predicted power gain over the target charge-time. The target charge-time confidence determination module 216 can estimate or predict power gain over the target charge-time in a variety of different manners. The target charge-time confidence determination module 216 determines the predicted power gain of the computing device 102 over the target charge-time based on an amount of power that is provided by a power source and/or features (or components) that are enabled on the computing device 102. Different power sources can provide different amounts of power (e.g., based on the particular power source and/or the manner in which the computing device 102 is connected to the power source). The target charge-time confidence determination module 216 can be configured with or otherwise obtain (e.g., from the power source, from a service via the Internet, etc.) an indication of the amount of power that the power source provides and thus the power gain of the computing device 102 over the target charge-time.

Additionally or alternatively, the target charge-time confidence determination module 216 can estimate or predict the power gain of the computing device 102 based on features (or components) that are enabled on the computing device 102. Different features or components, when turned on or running, can increase the time it takes for the energy storage device(s) 202 to be charged. For example, certain communications applications or navigation applications when running can increase the time it takes for the energy storage device(s) 202 to be charged. By way of another example, certain components such as GPS or other location awareness components when enabled or powered on can increase the time it takes for the energy storage device(s) 202 to be charged.

The increase in time for the energy storage device(s) 202 to charge when particular features or components are turned on or running can be determined in any of a variety of different manners. In one or more embodiments, the target charge-time confidence determination module 216 can obtained these increases in time from a developer or manufacturer of the computing device 102, from a developer or manufacturer of hardware used in the computing device 102, and so forth. The power increases can be provided by a developer or manufacturer in various manners, such as by providing a data file to the target charge-time confidence determination module 216, pre-configuring the target charge-time confidence determination module 216 with the time increases, making the time increases available to the target charge-time confidence determination module 216 via a service (e.g., accessed via the Internet), and so forth.

Additionally or alternatively, the increases in time for the energy storage device(s) 202 to charge when particular features or components are turned on or running can be predicted. In one or more embodiments, the target charge-time confidence determination module 216 maintains a record (e.g., over a matter of weeks or months) indicating the rate of power gain when the energy storage device(s) 202 are charging and particular features or components are turned on or running, as well as the rate of power gain when the energy storage device(s) 202 are charging and those particular features or components are not turned on or running. From this record, the target charge-time confidence determination module 216 can readily identify the increases in time for the energy storage device(s) 202 to charge when particular features or components are turned on or running.

Additionally or alternatively, the target charge-time confidence determination module 216 can obtain data from a service (e.g., via the Internet) that collects usage data for multiple additional computing devices. The service can provide an indication of the increases in time for the energy storage device(s) of the multiple additional computing devices to charge when particular features or components are turned on or running for those additional computing devices (or a subset of those additional computing devices that are of the same type as the computing device 102, that are being used by users having have the same characteristics as the user of the computing device 102, that have the same location as the computing device 102, etc. analogous to the discussion above). The target charge-time confidence determination module 212 can predict, for example, that the increase in time for the energy storage device(s) 202 of the computing device 102 to charge when particular features or components are turned on or running will be similar to or the same as the increases in time for the energy storage device(s) to charge as indicated by the service.

Given the target charge-time and the predicted power gain over the target charge-time, the target charge-time confidence determination module 216 determines what, if any, power management actions can be taken in order to achieve the target charge-time. If the predicted power gain over the target charge-time is sufficient to charge the energy storage device(s) 202 to the desired level, then no power management actions need be taken. However, if the predicted power gain over the target charge-time is not sufficient to charge the energy storage device(s) 202 to the desired level, then one or more power management actions are taken to reduce the time taken to charge the energy storage device(s) 202.

Various different power management actions can be taken by the target charge-time confidence determination module 216. In one or more embodiments, the power management actions include ceasing execution of one or more applications or programs. Additionally or alternatively, the power management actions include deactivating or powering off one or more components (e.g., a GPS device) in the computing device 102.

Each power management action has an associated reduction in charge time. For example, ceasing execution of a navigation application will reduce the time it takes to charge the energy storage device(s) 202 by some amount relative to not ceasing execution of the navigation application. This amount of time is the reduction in charge time associated with the power management action of ceasing execution of a navigation application. The target charge-time confidence determination module 216 can determine the increase in charge time associated with particular features or components being turned on or running in a variety of different manners as discussed above. Accordingly, the target charge-time confidence determination module 216 can readily determine the reduction in charge time associated with power management actions that include turning off or ceasing running features or components.

The target charge-time confidence determination module 216 identifies which one or more power management actions can be taken to reduce the charge time so that the target charge-time can be satisfied. Given the variety of different power management actions that can be taken, situations can arise in which various different combinations of power management actions can be used to achieve sufficient reductions in charge time so that the target charge-time can be satisfied.

In one or more embodiments, the target charge-time confidence determination module 216 identifies multiple sets of power management actions that can be taken to achieve sufficient reductions in charge time so that the target charge-time can be satisfied and associates each set with a confidence level. The target charge-time confidence determination module 216 can determine a confidence level for a set of power management actions that indicates the confidence that the target based power management system 126 has in (or the probability that) the set of power management actions achieving sufficient reductions in charge time so that the target charge-time is satisfied in any of a variety of different manners.

In one or more embodiments, the target charge-time confidence determination module 216 determines a confidence level for a set of power management actions based on how much data is available to use for determining how much reduction in charge time can be obtained for each of the power management actions. For example, if usage information for only the computing device 102 is available and includes only 4 instances of reductions in charge time obtained by ceasing executing a navigation application, then the confidence level would be lower (e.g., a confidence level of 50%) than if 50 instances of reductions in charge time obtained by ceasing executing a navigation application were available (e.g., a confidence level of 75%). Usage information can also be weighted differently based on the type of information and/or the source of the information. For example, usage information regarding the computing device 102 itself may be weighted more heavily than usage information regarding additional computing devices obtained from a service.

The confidence level can also be determined at least in part based on the duration of the target charge-time. The target charge-time confidence determination module 216 can assume that reductions in charge time over shorter amounts of time (shorter target charge-times) have higher confidence levels than reductions in charge time over longer amounts of time (longer target charge-times).

In one or more embodiments, the confidence level of each power management action is pre-determined and accessible to the target charge-time confidence determination module 216. The target charge-time confidence determination module 216 can be pre-configured with these confidence levels for the power management actions, can obtain the confidence levels for the power management actions from a service (e.g., via the Internet), and so forth.

In one or more embodiments, the target charge-time confidence determination module 216 combines the confidence levels of the individual power management actions in a set of power management actions to determine the confidence level for that set of power management actions. The confidence levels of the individual power management actions can be combined in different manners, such as averaging the confidence levels, performing a weighted averaging of the confidence levels, selecting a lowest (or alternatively highest) confidence level, and so forth.

The power management determination module 218 obtains one or more sets of power management actions from the target charge-time confidence determination module 216 and performs the power management actions in one of those one or more sets (e.g., ceases execution of an application, powers off a device, etc.). In one or more embodiments, the power management determination module 218 automatically selects a set of power management actions and performs those power management actions. The power management determination module 218 can determine which of the multiple sets of power management actions to select in various different manners, such as selecting the set of power management actions having the highest confidence level, the set of power management actions having the lowest confidence level that still satisfies a threshold value (e.g., 70%), and so forth.

Additionally or alternatively, the power management determination module 218 can display different sets of power management actions to the user and receive a user selection of one of the sets. The different power management actions in each set, as well as the confidence level of each set, are optionally displayed as well. This allows the user to select the power management actions that he or she desires, allowing the user to take into account confidence levels, specific power management actions, and so forth. For example, the power management actions included in a set that has a confidence level of 95% may be unacceptable to the user, in which case the user can select a set having a lower confidence level (e.g., 80%), knowing that the computing device 102 is less likely to achieve the target charge-time but still allowing the computing device 102 to run without having unacceptable power management actions implemented.

In the discussions herein, the target based power management system 126 is discussed as including a target run-time identification module 210 and target run-time confidence determination module 212, as well as a target charge-time identification module 214 and a target charge-time confidence determination module 216. It should be noted that the target based power management system 126 need not include both of these. For example, the target based power management system 126 may support target run-times but not target charge-times, and thus include a target run-time identification module 210 and target run-time confidence determination module 212, but not include a target charge-time identification module 214 and a target charge-time confidence determination module 216. By way of another example, the target based power management system 126 may support target charge-times but not target run-times, and thus include a target charge-time identification module 214 and a target charge-time confidence determination module 216, but not include a target run-time identification module 210 and target run-time confidence determination module 212.

It should be noted that although various different values, labels, levels, and so forth are discussed herein, these are examples and the techniques discussed herein are not limited to these examples. For example, any specific threshold values and/or labels discussed herein are only examples, and various other threshold values and/or labels can additionally or alternatively be used. These examples are illustrations only and are not intended to limit the scope of the techniques discussed herein.

Example Procedures

Figure 3:
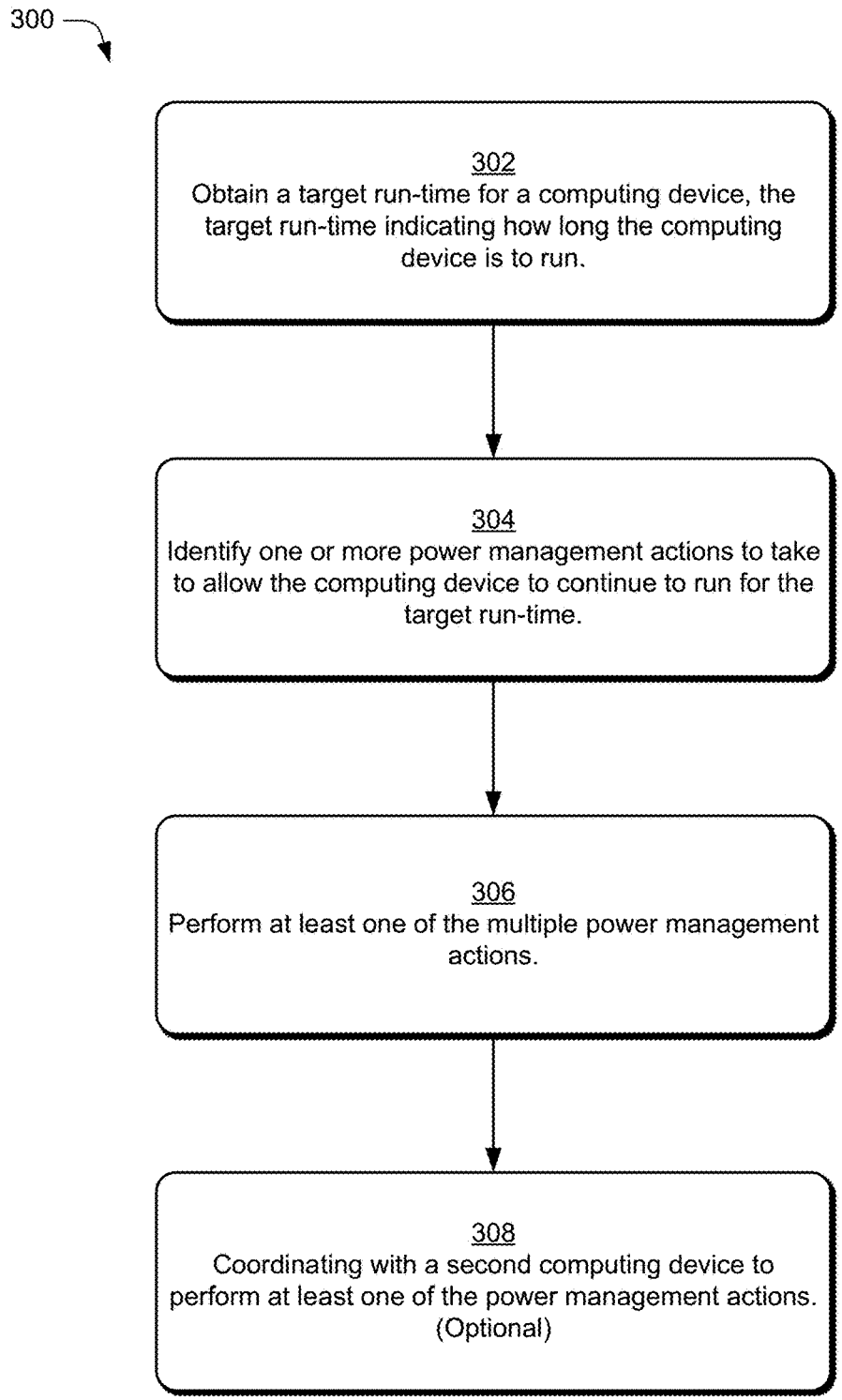
FIG. 3 is a flow diagram that describes details of an example procedure for target based power management in accordance with one or more implementations.
Figure 4:
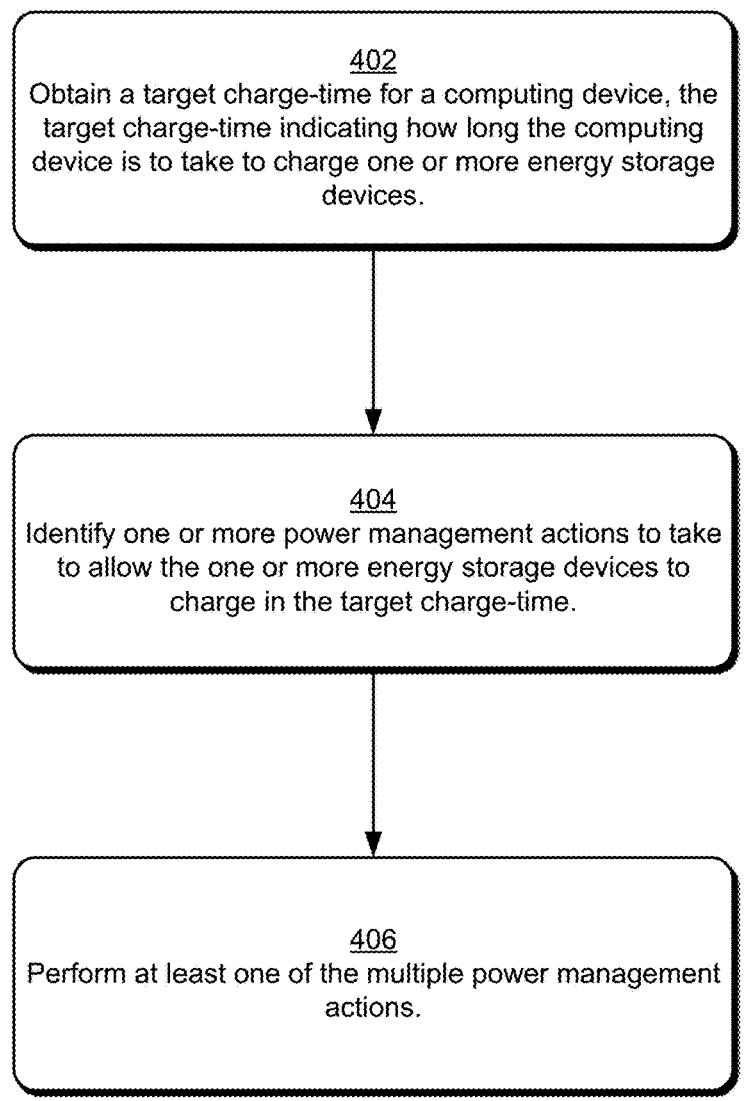
FIG. 4 is a flow diagram that describes details of another example procedure for target based power management in accordance with one or more implementations.

Further aspects of the dynamic external power resource selection techniques are discussed in relation to example procedures of FIGS. 3 and 4. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 3 is a flow diagram that describes details of an example procedure 300 for target based power management in accordance with one or more implementations. The procedure 300 describes details of using a target run-time. The procedure 300 can be implemented by way of a suitably configured computing device, such as by way of an operating system 108, target based power management system 126, and/or other functionality described in relation to the examples of FIGS. 1-2.

A target run-time for a computing device is obtained, the target run-time indicating how long the computing device is to run (block 302). The target run-time can be obtained in various manners as discussed above, such as being received via a user input to the computing device, being automatically determined, and so forth.

One or more power management actions to take to allow the computing device to continue to run for the target run-time are identified (block 304). Various different power management actions that reduce power usage over the target run-time can be taken in an attempt to allow the computing device to run for the duration of the target run-time. The power management actions can be identified based on usage information of the computing device as well as usage information from one or more additional computing devices.

At least one of the multiple power management actions are performed (block 306). Which power management actions are performed can be automatically determined by the computing device, or can be determined in response to user selection of a set of power management actions.

The computing device coordinates with another computing device to perform at least one power management action (block 308). This coordination is optional and need not be performed. Coordinating with another computing device refers to offloading or transferring operations or other functionality to another computing device (e.g., a wearable device in close proximity to the computing device) as discussed above.

FIG. 4 is a flow diagram that describes details of an example procedure 400 for target based power management in accordance with one or more implementations. The procedure 400 describes details of using a target charge-time. The procedure 400 can be implemented by way of a suitably configured computing device, such as by way of an operating system 108, target based power management system 126, and/or other functionality described in relation to the examples of FIGS. 1-2.

A target charge-time for a computing device is obtained, the target charge-time indicating how long the computing device is to take to charge one or more energy storage devices of the computing device (block 402). The target charge-time can be obtained in various manners as discussed above, such as being received via a user input to the computing device, being automatically determined, and so forth.

One or more power management actions to take to allow the energy storage devices to charge in the target charge-time are identified (block 404). These power management actions allow the energy storage devices to charge to a threshold level within the target charge-time, as discussed above. Various different power management actions that reduce charge time can be taken in an attempt to allow the energy storage devices to charge in the target charge-time. The power management actions can be identified based on usage information of the computing device as well as usage information from one or more additional computing devices.

At least one of the multiple power management actions are performed (block 406). Which power management actions are performed can be automatically determined by the computing device, or can be determined in response to user selection of a set of power management actions.

Example System

Figure 5:
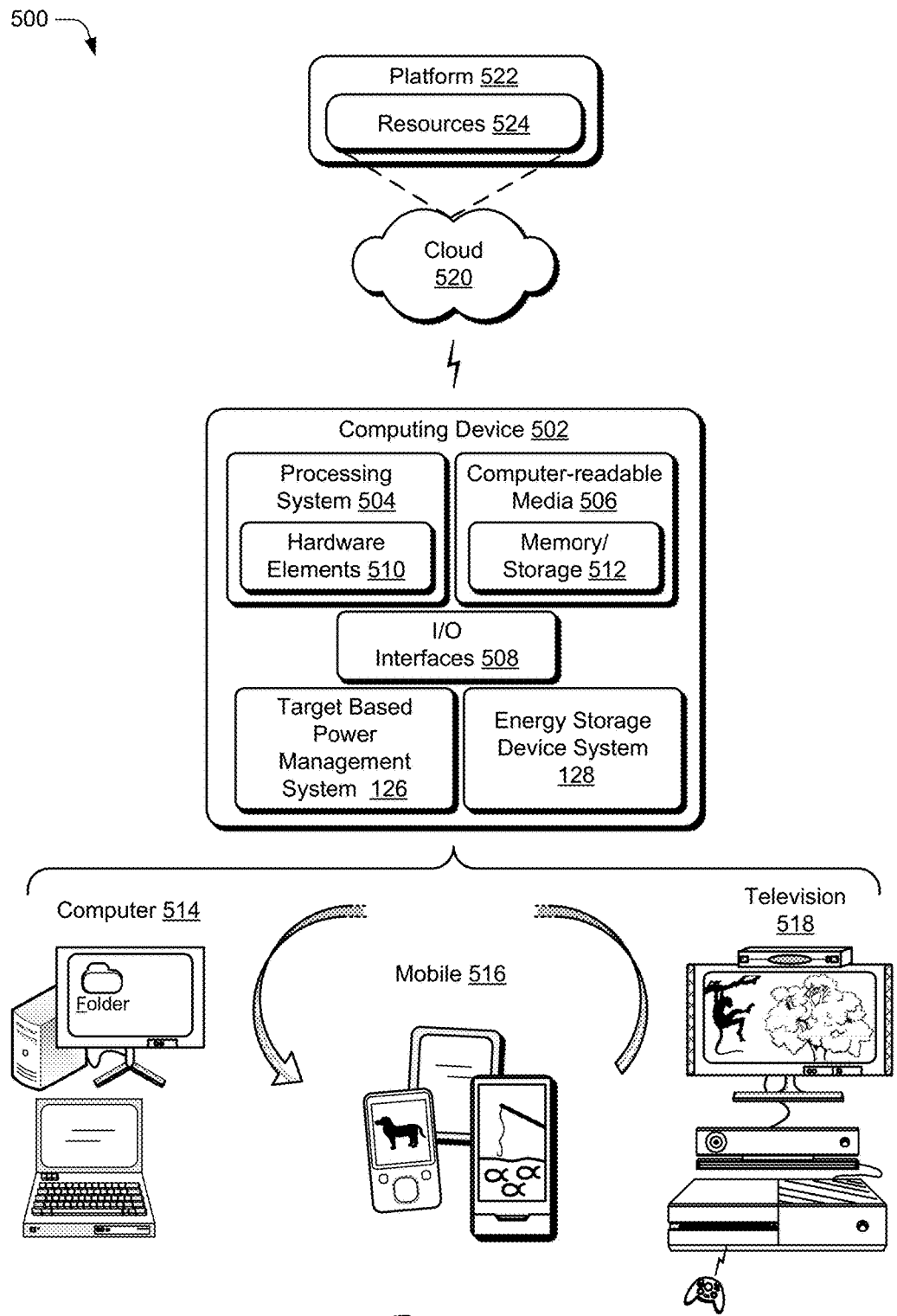
FIG. 5 illustrates an example system that includes an example computing device that is representative of one or more computing systems and/or devices that may implement the various techniques described herein.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, target based power management system 126, and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the target based power management system 126 and the energy storage device system 128 on the computing device 502. The functionality represented by target based power management system 126 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining a target run-time for a first computing device, the target run-time indicating how long the first computing device is to run given a current charge in one or more energy storage devices of the first computing device; identifying, based at least in part on the target run-time and the current charge, multiple power management actions to take to allow the first computing device to continue to run for the target run-time; performing a first of the multiple power management actions in the first computing device; and coordinating with a second computing device to perform a second of the multiple power management actions.

Alternatively or in addition to any of the methods or devices described herein, any one or combination of: the second computing device comprising a wearable device; the coordinating with the second computing device comprising communicating with the second computing device to inform the second computing device to run an application; the coordinating with the second computing device comprising transferring data to the second computing device for display by the second computing device; the coordinating further comprising transferring the data for display by the second computing device without powering on a display of the first computing device.

A first computing device comprising: an energy storage device system including one or more energy storage devices; a processing system; and a computer-readable storage medium having stored thereon multiple instructions that, responsive to execution by the processing system, cause the one or more processors to: obtain a target run-time for the first computing device, the target run-time indicating how long the first computing device is to run given a current charge in the one or more energy storage devices; identify, based at least in part on the target run-time and the current charge, one or more power management actions to take to allow the first computing device to continue to run for the target run-time, the identifying being further based at least in part on usage information from one or more additional computing devices separate from the first computing device; and perform at least one of the one or more power management actions in the first computing device.

Alternatively or in addition to any of the methods or devices described herein, any one or combination of: the one or more additional computing devices comprising computing devices that are of the same type as the first computing device; the one or more additional computing devices comprising computing devices that are used by users having the same characteristics as a user of the first computing device; the one or more additional computing devices comprising computing devices that have a same location as the first computing device; the multiple instructions further causing the one or more processors to coordinate with a second computing device to perform at least one of the one or more power management actions; the coordinating with the second computing device comprising transferring data to the second computing device for display by the second computing device; the multiple instructions further causing the one or more processors to obtain a target charge-time for the first computing device, the target charge-time indicating how long the first computing device is to take to charge the one or more energy storage devices, identify, based at least in part on the target charge-time and a predicted power gain over the target charge-time, one or more additional power management actions to take to allow the one or more energy storage devices to charge in the target charge-time, and perform the one or more additional power management actions in the first computing device.

A method comprising: obtaining a target charge-time for a first computing device, the target charge-time indicating how long the first computing device is to take to charge one or more energy storage devices of the first computing device; identifying, based at least in part on the target charge-time and a predicted power gain over the target charge-time, one or more power management actions to take to allow the one or more energy storage devices to charge in the target charge-time; and performing the one or more power management actions in the first computing device.

Alternatively or in addition to any of the methods or devices described herein, any one or combination of: the obtaining the target charge-time comprising receiving a user input indicating the target charge-time; the target charge-time indicating how long the first computing device is to take to charge the one or more energy storage devices to a threshold level; the identifying being further based at least in part on usage information from one or more additional computing devices separate from the first computing device; the predicted power gain being based at least in part on one or more applications running on the first computing device, and the one or more power management actions including ceasing execution of at least one of the one or more applications; the predicted power gain being based at least in part on one or more components of the first computing device that are powered on, and the one or more power management actions including powering off at least one of the one or more components; the method further comprising displaying multiple sets of power management actions to take to allow the one or more energy storage devices to charge in the target charge-time, receiving user selection of one of the multiple sets of power management actions, and the performing comprising performing the power management actions in the user selected one of the multiple sets; the method further comprising obtaining a target run-time for the first computing device, the target run-time indicating how long the first computing device is to run given a current charge in the one or more energy storage devices, identifying, based at least in part on the target run-time and the current charge, multiple additional power management actions to take to allow the first computing device to continue to run for the target run-time, performing a first of the multiple additional power management actions in the first computing device, and coordinating with a second computing device to perform a second of the multiple additional power management actions.

CONCLUSION

Although the example implementations have been described in language specific to structural features and/or methodological acts, it is to be understood that the implementations defined in the appended claims are not necessarily limited to the specific features or acts described.

Rather, the specific features and acts are disclosed as example forms of implementing the claimed features.

What is claimed is:

1. A method, comprising:
    obtaining a target run-time for a first computing device, the target run-time indicating how long the first computing device is to run given a current charge in one or more energy storage devices of the first computing device;
    identifying, based at least in part on the target run-time and the current charge, multiple power management actions to take and determining corresponding confidence levels individually as a probability value that one of the identified multiple power management actions taken by the first computing device would allow the first computing device to continue to run for the target run-time;
    selecting, based on the corresponding confidence levels of the identified multiple power management actions, first and second of the multiple management actions to take;
    performing the first of the multiple power management actions in the first computing device; and
    coordinating with a second computing device to perform the second of the multiple power management actions.

2. The method as recited in claim 1, wherein the second computing device comprising a wearable device.

3. The method as recited in claim 1, wherein the coordinating with the second computing device comprising communicating with the second computing device to inform the second computing device to run an application.

4. The method as recited in claim 1, wherein the coordinating with the second computing device comprising transferring data to the second computing device for display by the second computing device.

5. The method as recited in claim 4, wherein the coordinating further comprising transferring the data for display by the second computing device without powering on a display of the first computing device.

6. A first computing device, comprising:
    an energy storage device system including one or more energy storage devices;
    a processing system; and
    a computer-readable storage medium having stored thereon multiple instructions that, responsive to execution by the processing system, cause the one or more processors to:
        obtain a target run-time for the first computing device, the target run-time indicating how long the first computing device is to run given a current charge in the one or more energy storage devices;
        identify, based at least in part on the target run-time and the current charge, one or more power management actions to take and determining corresponding confidence levels individually as a probability value that one of the identified one or more power management actions taken by the first computing device would allow the first computing device to continue to run for the target run-time, the identifying being further based at least in part on usage information from one or more additional computing devices separate from the first computing device;
        select, based on the corresponding confidence levels of the identified one or more power management actions, at least one of the one or more management actions to take; and
        perform the selected at least one of the one or more power management actions in the first computing device.

7. The first computing device as recited in claim 6, wherein the one or more additional computing devices comprising computing devices that are of the same type as the first computing device.

8. The first computing device as recited in claim 6, wherein the one or more additional computing devices comprising computing devices that are used by users having the same characteristics as a user of the first computing device.

9. The first computing device as recited in claim 6, wherein the one or more additional computing devices comprising computing devices that have a same location as the first computing device.

10. The first computing device as recited in claim 6, wherein the multiple instructions further causing the one or more processors to coordinate with a second computing device to perform at least one of the one or more power management actions.

11. The first computing device as recited in claim 10, wherein the coordinating with the second computing device comprising transferring data to the second computing device for display by the second computing device.

12. The first computing device as recited in claim 6, wherein the multiple instructions further causing the one or more processors to:
    obtain a target charge-time for the first computing device, the target charge-time indicating how long the first computing device is to take to charge the one or more energy storage devices;
    identify, based at least in part on the target charge-time and a predicted power gain over the target charge-time, one or more additional power management actions to take to allow the one or more energy storage devices to charge in the target charge-time; and
    perform the one or more additional power management actions in the first computing device.

13. A method, comprising:
    obtaining a target charge-time for a first computing device, the target charge-time indicating how long the first computing device is to take to charge one or more energy storage devices of the first computing device;
    identifying, based at least in part on the target charge-time and a predicted power gain over the target charge-time, one or more power management actions to take and corresponding confidence levels individually as a probability value that one of the identified one or more power management actions taken by the first computing device would allow the one or more energy storage devices to charge in the target charge-time;
    selecting, based on the corresponding confidence levels of the identified one or more power management actions, first and second of the multiple management actions to take; and
    performing the selected at least one of the one or more power management actions in the first computing device.

14. The method as recited in claim 13, wherein the obtaining the target charge-time comprising receiving a user input indicating the target charge-time.

15. The method as recited in claim 13, wherein the target charge-time indicating how long the first computing device is to take to charge the one or more energy storage devices to a threshold level.

16. The method as recited in claim 13, wherein the identifying being further based at least in part on usage information from one or more additional computing devices separate from the first computing device.

17. The method as recited in claim 13, wherein the predicted power gain being based at least in part on one or more applications running on the first computing device, and the one or more power management actions including ceasing execution of at least one of the one or more applications.

18. The method as recited in claim 13, wherein the predicted power gain being based at least in part on one or more components of the first computing device that are powered on, and the one or more power management actions including powering off at least one of the one or more components.

19. The method as recited in claim 13, further comprising:
displaying multiple sets of power management actions to take to allow the one or more energy storage devices to charge in the target charge-time;
receiving user selection of one of the multiple sets of power management actions; and
the performing comprising performing the power management actions in the user selected one of the multiple sets.

20. The method as recited in claim 13, further comprising:
obtaining a target run-time for the first computing device, the target run-time indicating how long the first computing device is to run given a current charge in the one or more energy storage devices;
identifying, based at least in part on the target run-time and the current charge, multiple additional power management actions to take to allow the first computing device to continue to run for the target run-time;
performing a first of the multiple additional power management actions in the first computing device; and
coordinating with a second computing device to perform a second of the multiple additional power management actions.

* * * * *